United States Patent
Ebiko (10) Patent No.: US 11,505,008 B2
(45) Date of Patent: Nov. 22, 2022

(54) PNEUMATIC TIRE

(71) Applicant: The Yokohama Rubber Co., LTD., Tokyo (JP)

(72) Inventor: Masahiro Ebiko, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 680 days.

(21) Appl. No.: 16/096,676

(22) PCT Filed: Feb. 22, 2017

(86) PCT No.: PCT/JP2017/006477
§ 371 (c)(1),
(2) Date: Oct. 25, 2018

(87) PCT Pub. No.: WO2017/187734
PCT Pub. Date: Nov. 2, 2017

(65) Prior Publication Data
US 2021/0221181 A1    Jul. 22, 2021

(30) Foreign Application Priority Data

Apr. 26, 2016   (JP) .............................. JP2016-088150

(51) Int. Cl.
*B60C 11/03* (2006.01)
*B60C 11/12* (2006.01)
*B60C 11/04* (2006.01)

(52) U.S. Cl.
CPC ...... *B60C 11/1236* (2013.01); *B60C 11/0306* (2013.01); *B60C 11/1204* (2013.01);
(Continued)

(58) Field of Classification Search
CPC ..... B60C 2011/0381; B60C 2011/1213; B60C 11/12; B60C 11/1236; B60C 11/03;
(Continued)

(56) References Cited

U.S. PATENT DOCUMENTS

D491,881 S  *  6/2004  Ebiko ........................ D12/551
2009/0255614 A1* 10/2009 Ebiko ................. B60C 11/0306
152/209.8
(Continued)

FOREIGN PATENT DOCUMENTS

CA    2 877 642    5/2014
CN    104097462    10/2014
(Continued)

OTHER PUBLICATIONS

Machine Translation JP2010013075; Morito, Takumi (Year: 2010).*
(Continued)

*Primary Examiner* — Robert C Dye
*Assistant Examiner* — Nicholas J Weiler
(74) *Attorney, Agent, or Firm* — Thorpe North & Western (57) ABSTRACT

Disclosed is a pneumatic tire including: in a tread surface of a tread portion, a pair of main grooves (center main groove and shoulder main groove) arranged side by side in a tire lateral direction and extending in a tire circumferential direction; land portions (middle land portion) defined by the main grooves; a plurality of lug grooves arranged side by side in the tire circumferential direction and bent and folded back, each of the lug grooves including one end communicating with the shoulder main groove, the other end terminating within the middle land portion, and a bending point in a middle of a path from one end to the other end; and sipes extending across the lug grooves, at least one side of the sipe with respect to the lug groove being formed in a zigzag shape.

13 Claims, 6 Drawing Sheets (52) U.S. Cl.
CPC ... *B60C 11/1272* (2013.01); *B60C 2011/0348* (2013.01); *B60C 2011/0358* (2013.01); *B60C 2011/0381* (2013.01); *B60C 2011/0383* (2013.01); *B60C 2011/0395* (2013.01); *B60C 2011/1213* (2013.01)

(58) Field of Classification Search
CPC . B60C 11/0306; B60C 11/0304; B60C 11/04; B60C 11/1204; B60C 2011/1227
See application file for complete search history.

(56) References Cited

U.S. PATENT DOCUMENTS

| | | |
|---|---|---|
| 2010/0000641 A1 | 1/2010 | Morito et al. |
| 2010/0154952 A1* | 6/2010 | Kageyama ............... B60C 11/12 152/209.18 |
| 2012/0312438 A1 | 12/2012 | Shinzawa |
| 2013/0118663 A1 | 5/2013 | Kishizoe |
| 2013/0240100 A1 | 9/2013 | Miyoshi et al. |
| 2014/0230979 A1 | 8/2014 | Rubber |
| 2014/0305559 A1 | 10/2014 | Takemoto |
| 2016/0144666 A1 | 5/2016 | Rubber |
| 2016/0207359 A1 | 7/2016 | Nukushina |
| 2017/0190222 A1 | 7/2017 | Suzuki |

FOREIGN PATENT DOCUMENTS

| | | |
|---|---|---|
| DE | 10 2012 209 502 | 12/2012 |
| DE | 10 2012 220 568 | 5/2013 |
| DE | 10 2013 203 179 | 9/2013 |
| DE | 11 2015 002 715 | 3/2017 |
| EP | 3 375 639 | 9/2018 |
| JP | 2009-090874 | 4/2009 |
| JP | 2010-013075 | 1/2010 |
| JP | 4925660 | 5/2012 |
| JP | 2012-171479 | 9/2012 |
| JP | 2013023195 A * | 2/2013 |
| JP | 5277772 | 8/2013 |
| JP | 2014-177262 | 9/2014 |
| JP | 2014-205410 | 10/2014 |
| JP | 2015-209169 | 11/2015 |
| WO | WO 2014/077271 | 5/2014 |
| WO | WO 2015/008659 | 1/2015 |
| WO | WO 2015/033818 | 3/2015 |
| WO | WO 2016/024593 | 2/2016 |
| WO | WO 2017/082408 | 5/2017 |

OTHER PUBLICATIONS

Machine Translation WO2016024953; Suzuki, Naoko (Year: 2016).*
JP 2013023195 Machine Translation; Takei, Ataka (Year: 2013).*
International Search Report for International Application No. PCT/JP2017/006477 dated May 23, 2017, 4 pages, Japan.

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|---|---|---|---|---|---|
| CURVE IN LUG GROOVE | NO | CURVED | CURVED | CURVED | CURVED | CURVED | CURVED | CURVED | CURVED | CURVED | CURVED | CURVED | CURVED | CURVED | CURVED |
| BENDING (HOOK SHAPE) | NO | BENT | BENT | BENT | BENT | BENT | BENT | BENT | BENT | BENT | BENT | BENT | BENT | BENT | BENT |
| SIPE ACROSS LUG GROOVE | NO | YES | YES | YES | YES | YES | YES | YES | YES | YES | YES | YES | YES | YES | YES |
| SIPE HAS ZIGZAG SHAPE | NO | NO | YES | YES | YES | YES | YES | YES | YES | YES | YES | YES | YES | YES | YES |
| ANGLE BETWEEN LUG GROOVE AND MAIN GROOVE θ [°] | 15 | 15 | 15 | 40 | 25 | 25 | 25 | 25 | 25 | 25 | 25 | 25 | 25 | 25 | 25 |
| BENDING ANGLE φ [°] | - | -1 | -1 | -1 | -1 | 8 | 15 | 8 | 8 | 8 | 8 | 8 | 8 | 8 | 8 |
| ACUTE ANGLE OF ONE SIDE OF SIPE CROSSING MAIN GROOVE α [°] | 30 | 30 | 30 | 30 | 30 | 30 | 30 | 80 | 60 | 65 | 65 | 65 | 65 | 65 | 65 |
| ACUTE ANGLE OF THE OTHER SIDE OF SIPE NOT CROSSING MAIN GROOVE β [°] | 30 | 30 | 30 | 30 | 30 | 30 | 30 | 80 | 72 | 65 | 65 | 65 | 65 | 65 | 65 |
| TERMINATES WITHIN LAND PORTION | NO | NO | NO | NO | NO | NO | NO | NO | NO | NO | NO | TERMINATES | TERMINATES | TERMINATES | TERMINATES |
| WIDTH OF ZIGZAG SHAPE OF SIPE d1 [mm] | - | - | 3.5 | 3.5 | 3.5 | 3.5 | 3.5 | 3.5 | 3.5 | 3.5 | 3.5 | 1.0 | 1.0 | 2.3 | 3.5 |
| PITCH BETWEEN BENDING POINTS IN ZIGZAG SHAPE OF SIPE d2 [mm] | - | - | 3.5 | 3.5 | 3.5 | 3.5 | 3.5 | 3.5 | 3.5 | 3.5 | 3.5 | 1.0 | 3.5 | 2.3 | 1.0 |
| STEERING STABILITY ON DRY ROAD SURFACE | 100 | 95 | 100 | 106 | 103 | 106 | 103 | 109 | 109 | 109 | 112 | 120 | 115 | 118 | 115 |
| STEERING STABILITY ON WET ROAD SURFACE | 100 | 110 | 115 | 105 | 110 | 115 | 120 | 115 | 110 | 115 | 115 | 115 | 115 | 115 | 115 |
| STEERING STABILITY ON SNOWY ROAD SURFACE | 100 | 115 | 120 | 110 | 115 | 120 | 115 | 110 | 115 | 115 | 110 | 105 | 105 | 108 | 110 |

FIG. 4

|  | Conventional Example | Comparative Example | Example 1 | Example 2 | Example 3 | Example 4 | Example 5 |
|---|---|---|---|---|---|---|---|
| Curve in lug groove | No | Curved | Curved | Curved | Curved | Curved | Curved |
| Bending (hook shape) | No | Bent | Bent | Bent | Bent | Bent | Bent |
| Sipe across lug groove | No | Yes | Yes | Yes | Yes | Yes | Yes |
| Sipe has zigzag shape | No | No | Yes | Yes | Yes | Yes | Yes |
| Angle between lug groove and main groove θ [°] | 15 | 15 | 15 | 40 | 25 | 25 | 25 |
| Bending angle φ [°] | - | -1 | -1 | -1 | -1 | 8 | 15 |
| Acute angle of one side of sipe crossing main groove α [°] | 30 | 30 | 30 | 30 | 30 | 30 | 30 |
| Acute angle of the other side of sipe not crossing main groove β [°] | 30 | 30 | 30 | 30 | 30 | 30 | 30 |
| Terminates within land portion | No | No | No | No | No | No | No |
| Width of zigzag shape of sipe d1 [mm] | - | - | 3.5 | 3.5 | 3.5 | 3.5 | 3.5 |
| Pitch between bending points in zigzag shape of sipe d2 [mm] | - | - | 3.5 | 3.5 | 3.5 | 3.5 | 3.5 |
| Steering stability on dry road surface | 100 | 95 | 100 | 106 | 103 | 106 | 103 |
| Steering stability on wet road surface | 100 | 110 | 115 | 105 | 110 | 115 | 120 |
| Steering stability on snowy road surface | 100 | 115 | 120 | 110 | 115 | 120 | 115 |

FIG. 4A

|  | Example 6 | Example 7 | Example 8 | Example 9 | Example 10 | Example 11 | Example 12 | Example 13 |
|---|---|---|---|---|---|---|---|---|
| Curve in lug groove | Curved | Curved | Curved | Curved | Curved | Curved | Curved | Curved |
| Bending (hook shape) | Bent | Bent | Bent | Bent | Bent | Bent | Bent | Bent |
| Sipe across lug groove | Yes | Yes | Yes | Yes | Yes | Yes | Yes | Yes |
| Sipe has zigzag shape | Yes | Yes | Yes | Yes | Yes | Yes | Yes | Yes |
| Angle between lug groove and main groove θ [°] | 25 | 25 | 25 | 25 | 25 | 25 | 25 | 25 |
| Bending angle φ [°] | 8 | 8 | 8 | 8 | 8 | 8 | 8 | 8 |
| Acute angle of one side of sipe crossing main groove α [°] | 80 | 60 | 65 | 65 | 65 | 65 | 65 | 65 |
| Acute angle of the other side of sipe not crossing main groove β [°] | 80 | 72 | 65 | 65 | 65 | 65 | 65 | 65 |
| Terminates within land portion | No | No | No | No | Terminates | Terminates | Terminates | Terminates |
| Width of zigzag shape of sipe d1 [mm] | 3.5 | 3.5 | 3.5 | 3.5 | 1.0 | 1.0 | 2.3 | 3.5 |
| Pitch between bending points in zigzag shape of sipe d2 [mm] | 3.5 | 3.5 | 3.5 | 3.5 | 1.0 | 3.5 | 2.3 | 1.0 |
| Steering stability on dry road surface | 109 | 109 | 109 | 112 | 120 | 115 | 118 | 115 |
| Steering stability on wet road surface | 115 | 110 | 115 | 115 | 115 | 115 | 115 | 115 |
| Steering stability on snowy road surface | 110 | 115 | 115 | 110 | 105 | 105 | 108 | 110 |

FIG. 4B

PNEUMATIC TIRE

TECHNICAL FIELD

The present technology relates to a pneumatic tire.

BACKGROUND ART

Conventionally, for example, Japan Unexamined Patent Publication No. 2014-205410 discusses a pneumatic tire including a rib-shaped land portion between a pair of main grooves, a plurality of bent-shaped subsidiary grooves formed in the land portion, each including one end communicating with a circumferential groove and one end terminating within the land portion, and sipes formed across the subsidiary groove.

Conventionally, for example, Japan Patent No. 5277772 discusses a pneumatic tire including a rib-shaped land portion between a pair of main grooves, a plurality of curved grooves formed in the land portion and curved in the middle, each of the curved grooves including one end communicating with a circumferential groove and one end terminating within the land portion, and sipes formed across the curved grooves.

Conventionally, for example, Japan Patent No. 4925660 discusses a pneumatic tire (tire) including a rib-shaped land portion between a pair of circumferential grooves, a plurality of lateral grooves formed in the land portion, each of the lateral grooves including one end communicating with the circumferential groove and one end terminating within the land portion, and sipes formed communicating with the lateral grooves.

The pneumatic tire discussed in Japan Unexamined Patent Publication No. 2014-205410 is to improve snow performance (braking performance on a snowy road surface), but it is desirable to improve steering stability on a snowy road surface.

The pneumatic tire discussed in Japan Patent No. 5277772 is to improve balance between steering stability and water drainage performance, but it is desirable to improve steering stability on a snowy road surface.

In addition, the pneumatic tire discussed in Japan Patent No. 4925660 is to reduce an air column resonance sound without degrading anti-wear performance of the tire.

SUMMARY

The present technology provides a pneumatic tire capable of improving steering stability on a snowy road surface while securing steering stability on dry and wet road surfaces.

According to an aspect of the technology, there is provided a pneumatic tire including: in a tread surface of a tread portion, a pair of main grooves arranged side by side in a tire lateral direction and extending in a tire circumferential direction; land portions defined by the main grooves; a plurality of lug grooves arranged side by side in the tire circumferential direction and bent and folded back, each of the lug grooves including one end communicating with one of the main grooves, the other end terminating within the land portion, and a bending point in a middle of a path from one end to the other end; and sipes extending across the lug grooves, at least one side of the sipe with respect to the lug groove being formed in a zigzag shape.

In this pneumatic tire, since the lug groove includes one end communicating with the main groove, the other end terminates within the land portion, and a bending point in the middle of a path from one end to the other end so as to be bent and folded back, it is possible to secure a groove area inside the land portion, retain the water drainage performance, and guarantee steering stability on a wet road surface.

In addition, since the lug groove has one end communicating with the main groove and the other end terminating within the land portion, it is possible to retain stiffness in the land portion and secure steering stability on a dry road surface.

Furthermore, since the sipes are provided, it is possible to improve water drainage performance and secure steering stability on a wet road surface.

Moreover, since the sipes are formed in a zigzag shape, it is possible to improve steering stability on a snowy road surfaces with an excellent edge effect.

In the pneumatic tire according to an aspect of the technology, it is preferable that one end of the sipe with respect to the lug groove communicates with the main groove, and the other end of the sipe terminates within the land portion.

In this pneumatic tire, since one end of the sipe communicates with the main groove, it is possible to improve the water drainage performance and assist securement of steering stability on a wet road surface.

In addition, since the other end of the sipe terminates within the land portion, it is possible to retain stiffness in the land portion and assist securement of steering stability on a dry road surface.

In the pneumatic tire according to an aspect of the technology, it is preferable that one end of the sipe communicates with the main groove, the other end does not communicate with the main groove, an acute angle α of one end side with respect to the tire circumferential direction ranges from 45° to 70°, and an acute angle β of the other end side with respect to the tire circumferential direction is within an angle range of α±10°.

In this pneumatic tire, since the angle α is set to 45° or greater, it is possible to suppress degradation of stiffness of the land portion and assist securement of the steering stability on a dry road surface.

Meanwhile, by setting the angle α to 70° or less, it is possible to assist improvement of steering stability on a snowy road surfaces with an excellent edge effect in the lateral direction (tire lateral direction).

Furthermore, since the sipe extends substantially straightly across the lug groove by setting the angle β to a range of α±10°, it is possible to improve water drainage performance and assist securement of steering stability on a wet road surface.

In the pneumatic tire according to an aspect of the technology, it is preferable that the zigzag shape of the sipe has a width d1 of 3 mm or less and a pitch d2 between the closest bending points in an extending direction set to 3 mm or less.

In this pneumatic tire, since the width d1 of the zigzag shape of the sipe is set to 3 mm or less, it is possible to suppress degradation of stiffness around the sipe and assist securement of steering stability on a dry road surface.

In addition, since the pitch between the bending points of the zigzag shape of the sipe in the extending direction is set to 3 mm or less, it is possible to assist improvement of steering stability on a snowy road surfaces with an excellent edge effect.

Using the pneumatic tire according to an embodiment of the present technology, it is possible to improve steering stability on a snowy road surface while securing steering stability on dry and wet road surfaces.

DETAILED DESCRIPTION

Embodiments of the present technology will now be described in detail with reference to the accompanying drawings.

Note that the present technology is not limited by such embodiments.

Constituents of the embodiments encompass elements easily replaceable by those skilled in the art or elements substantially equivalent thereto.

Furthermore, the modified examples described in the embodiments may be combined as desired within the scope apparent to those skilled in the art.

Figure 1:
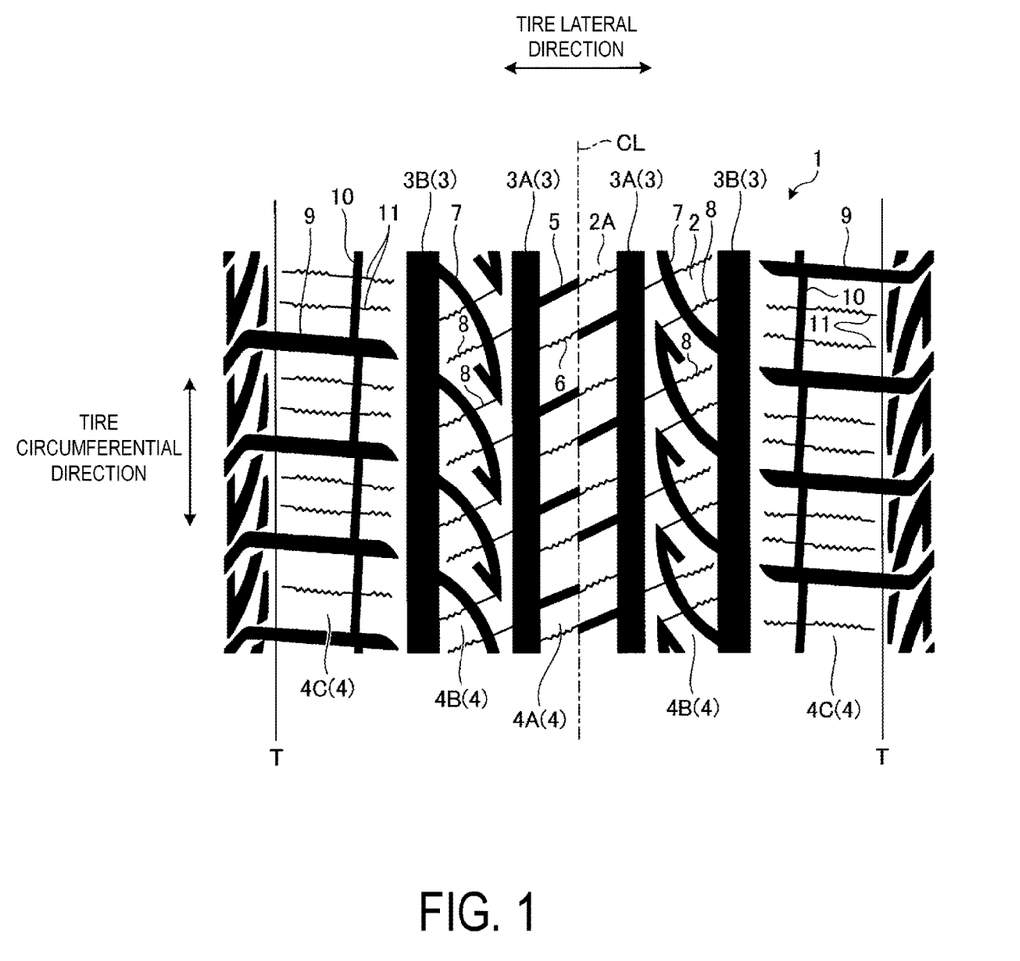
FIG. 1 is a plan view illustrating a tread portion of a pneumatic tire according to an embodiment of the technology.

FIG. 1 is a plan view illustrating a tread plan view of a pneumatic tire according to the present embodiment.

Figure 2:
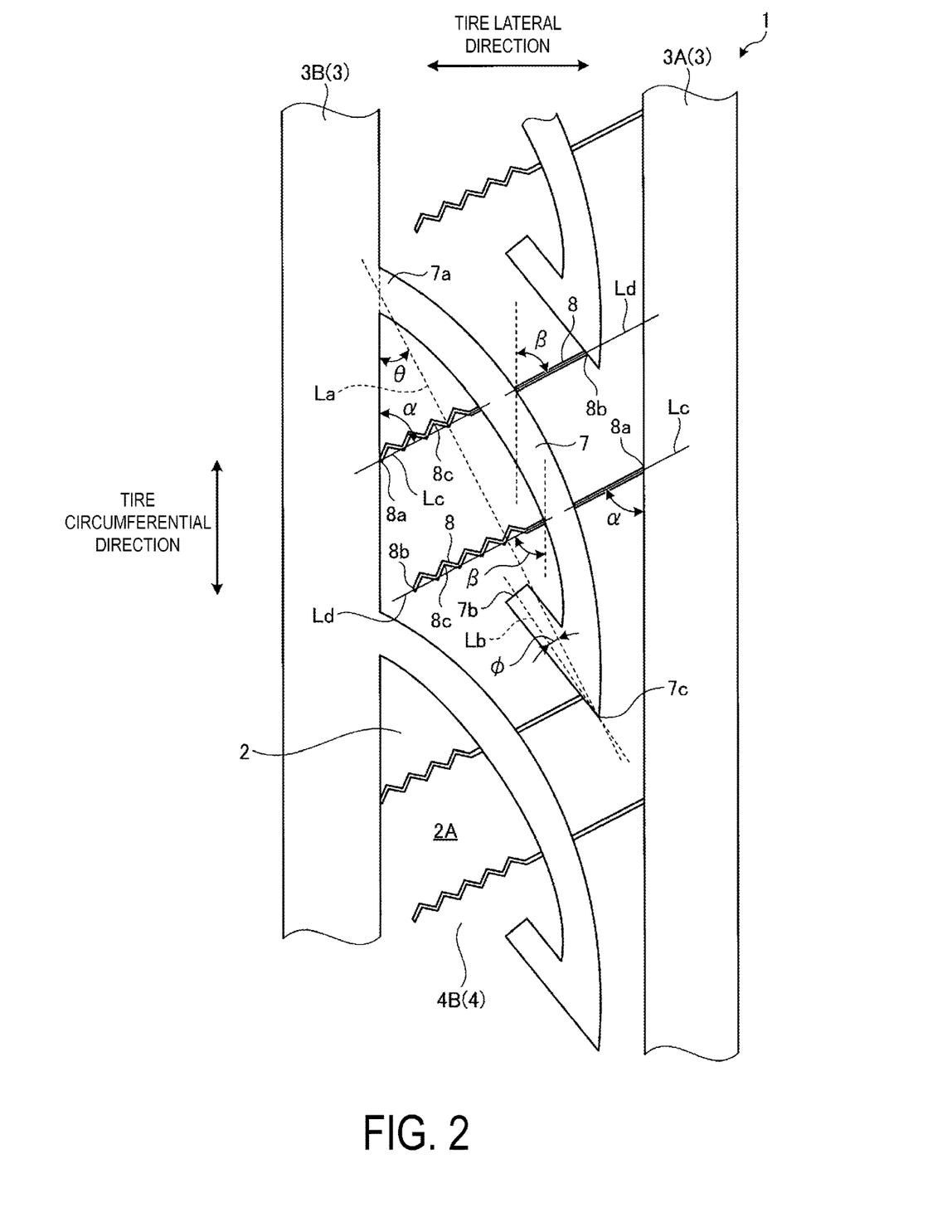
FIG. 2 is a partial enlarged plan view illustrating a tread portion of a pneumatic tire according to an embodiment of the technology.
Figure 3:
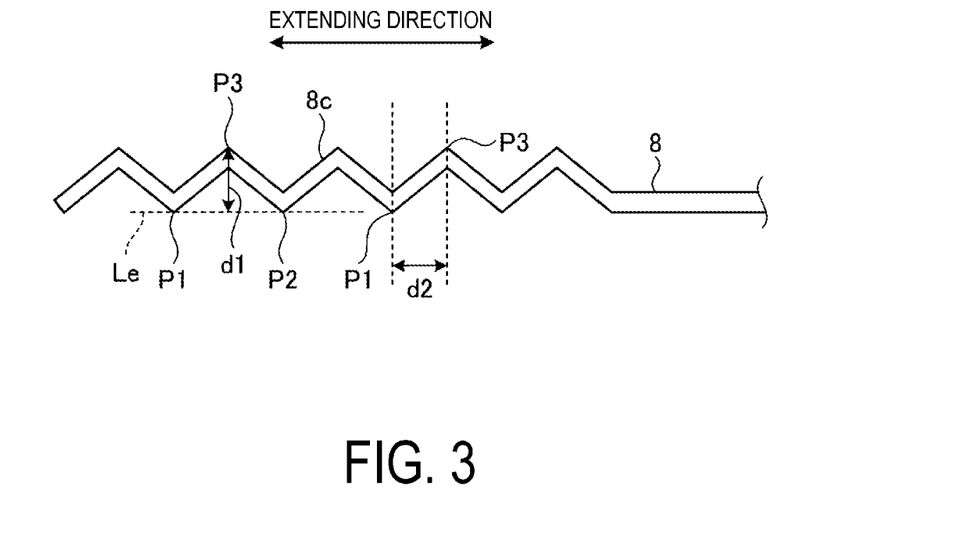
FIG. 3 is a partial enlarged plan view illustrating a tread portion of a pneumatic tire according to an embodiment of the technology.

FIGS. 2 and 3 are partial enlarged plan view illustrating a tread surface of a pneumatic tire according to the present embodiment.

Herein, "tire circumferential direction" refers to a circumferential direction with the rotation axis (not shown) of a pneumatic tire 1 as the center axis.

In addition, "tire lateral direction" refers to a direction parallel with the rotation axis. "Inward in the tire lateral direction" refers to a direction toward a tire equatorial plane CL (tire equator line) in the tire lateral direction. "Outward in the tire lateral direction" refers to a direction apart from the tire equatorial plane CL in the tire lateral direction.

"Tire radial direction" refers to a direction orthogonal to the rotation axis of the pneumatic tire.

"Tire equatorial plane" is a plane which is normal to the rotation axis and passes through a center of a tire width of the pneumatic tire 1.

"Tire equator line" refers to a line extending along the tire circumferential direction of the pneumatic tire 1 on the tire equatorial plane CL.

In the present embodiment, the tire equator line and the tire equatorial plane are denoted by the same reference sign CL.

As illustrated in FIG. 1, the pneumatic tire 1 of the present embodiment includes a tread portion 2.

The tread portion 2 is formed of a rubber material and is exposed on the outermost side in the tire radial direction of the pneumatic tire 1. The tread portion 2 includes a surface that serves as a tread surface 2a and forms the profile of the pneumatic tire 1.

The tread surface 2a of the tread portion 2 includes a plurality of main grooves 3 (four in the present embodiment) that extend in the tire circumferential direction and are arranged side by side in the tire lateral direction.

In addition, in the present embodiment, a pair of the main grooves 3 centrally placed in the tire lateral direction on either side of the tire equatorial plane CL will be referred to as "center main grooves" (first main grooves) 3A.

Furthermore, each main groove 3 placed outward of each center main groove 3A in the tire lateral direction will be referred to as a "shoulder main groove (second main groove) 3B".

Note that the main grooves 3 have a groove width ranging from 5 mm to 20 mm and a groove depth (tire radial direction dimension from an opening position on the tread surface 2a to a groove bottom) ranging from 5 mm to 15 mm.

The tread surface 2a of the tread portion 2 includes a plurality of land portions 4 (five in the present embodiment) defined by the main grooves 3 in the tire lateral direction.

In addition, in the present embodiment, the land portion 4 arranged on the tire equatorial plane CL between the center main grooves 3A will be referred to as a "center land portion 4A".

Furthermore, the land portion 4 placed between the center main groove 3A and the shoulder main groove 3B outward of the center main groove 3A in the tire lateral direction will be referred to as a "middle land portion 4B".

Moreover, the land portion 4 outward of the shoulder main groove 3B in the tire lateral direction will be referred to as a "shoulder land portion 4C".

The center land portion 4A includes lug grooves 5 and sipes 6.

A plurality of lug grooves 5 are arranged side by side in the tire circumferential direction, and each of the lug grooves 5 includes one end communicating with the center main groove 3A and the other end terminating within the center land portion 4A.

The lug groove 5 extends from one end to the other end generally in the tire lateral direction toward the other center main groove 3A neighboring the center main groove 3A communicating with the one end and is inclined in the tire circumferential direction.

The lug grooves 5 are arranged alternately along the tire circumferential direction such that the lug grooves 5 are inclined in a codirectional manner in each of the neighboring center main grooves 3A.

The center land portions 4A are formed in a rib shape continuous in the tire circumferential direction excluding the sipes 6.

The lug grooves 5 have a groove width ranging from 1.5 mm to 6.0 mm and a groove depth equal to or less than that of the main groove 3.

The sipe 6 includes one end communicating with the other terminated end of the lug groove 5 and the other end communicating with the other center main groove 3A neighboring the center main groove 3A communicating with the one end of the lug groove 5.

The sipe 6 extends in parallel with the extending direction of the lug groove 5.

The sipe 6 has a zigzag shape.

The zigzag shape refers to a pattern of the opening on the tread surface 2A continuous and bent a plurality of times.

The sipe 6 may be a two-dimensional sipe having a zigzag shape formed in the tire radial direction inside the tread portion 2 to match the zigzag shape of the tread surface 2A. Alternatively, the sipe 6 may be a three-dimensional sipe bent more than the zigzag shape.

The sipes 6 have a groove width ranging from 0.3 mm to 1.2 mm and a groove depth equal to or less than that of the main groove 3.

The middle land portion 4B includes lug grooves 7 and sipes 8.

As illustrated in FIGS. 1 and 2, a plurality of lug grooves 7 are arranged side by side in the tire circumferential direction, and each of the lug grooves 7 includes one end 7a communicating with the shoulder main groove 3B and the other end 7b terminating within the middle land portion 4B.

The lug groove 7 extending from the one end 7a to the other end 7b is bent and folded back at a bending point 7c to form a hook shape.

The illustrated lug groove 7 extends from the one end 7a to the bending point 7c and then extends generally in the tire lateral direction toward the center main groove 3A while being inclined in the tire circumferential direction.

The lug groove 7 extends from the one end 7a to the bending point 7c and is then curved to return to the shoulder main groove 3B.

The lug groove 7 is bent and folded back at the bending point 7c to return to the shoulder main groove 3B and then straightly extends to the other terminated end 7b.

The lug groove 7 extends from the one end 7a to the bending point 7c with a constant groove width and then extends from the bending point 7c to the other end 7b with a constant groove width.

The middle land portion 4B is formed in a rib shape continuous in the tire circumferential direction excluding the sipes 8.

The lug grooves 7 have a groove width ranging from 1.5 mm to 6.0 mm and a groove depth equal to or less than that of the main groove 3.

As illustrated in FIGS. 1 and 2, the sipe 8 extends across the lug groove 7 and includes one end 8a communicating with the main groove 3 (center main groove 3A or shoulder main groove 3B) and the other end 8b terminating within the middle land portion 4B.

Here, the terminated end of the sipe 8 includes a case where the sipe 8 terminates in the tread surface 2A of the middle land portion 4B and a case where the sipe 8 is terminates at the lug groove 7 other than the crossing lug groove 7.

That is, the sipe 8 includes one end 8a communicating with the main groove 3 and the other end 8b that does not communicate with the main groove 3.

In addition, the sipe 8 extends across the lug groove 7 and has a zigzag shape on at least one of the sides divided by the lug groove 7.

The zigzag shape refers to a pattern of the opening on the tread surface 2A continuously formed with a plurality of bent portions 8c.

The sipe 8 may be a two-dimensional sipe in which the pattern toward the tire radial direction inside the tread portion 2 has a zigzag shape along the zigzag shape of the tread surface 2A or a three-dimensional sipe bent more than the zigzag shape.

The sipes 8 have a groove width ranging from 0.3 mm to 1.2 mm and a groove depth equal to or less than that of the main groove 3.

The shoulder land portion 4C includes lug grooves 9 and 10 and sipes 11.

A plurality of lug grooves 9 extending in the tire lateral direction are arranged side by side in the tire circumferential direction. The lug groove 9 terminates at one end within a ground contact region without communicating with the shoulder main groove 3B and extends outward in the tire lateral direction crossing a grounding edge T.

The lug groove 10 extends in the tire circumferential direction inside the ground contact region and communicates with the lug grooves 9 neighboring in the tire circumferential direction so that the lug grooves 9 are connected to each other.

The shoulder land portion 4C is formed in a rib shape continuous in the tire circumferential direction.

Sipes 11 extending in the tire lateral direction are arranged side by side in the tire circumferential direction and terminate within the ground contact region without communicating with the shoulder main groove 3B. The sipes 11 extend outward in the tire lateral direction without crossing the grounding edge T (or may cross the grounding edge T).

A plurality of the sipes 11 (in the present embodiment, two) are provided in each gap between the lug grooves 9 neighboring in the tire circumferential direction across the lug groove 10.

The sipes 11 are formed in a zigzag shape.

The zigzag shape refers to a pattern of the opening continuously formed toward the tread surface 2A with a plurality of bent portions.

The sipe 11 may be a two-dimensional sipe having a zigzag shape formed in the tire radial direction inside the tread portion 2 to match the zigzag shape of the tread surface 2A. Alternatively, the sipe 11 may be a three-dimensional sipe bent more than the zigzag shape.

The lug groove 9 has a groove width ranging from 2.0 mm to 8.0 mm. The lug groove 10 has a groove width ranging from 1.5 mm to 6.0 mm. The grove depth is set to be equal to or less than that of the main groove 3.

The sipes 11 have a groove width ranging from 0.3 mm to 1.2 mm and a groove depth equal to or less than that of the main groove 3.

Here, the grounding edge T refers to both outermost edges of the ground contact region in the tire lateral direction. In FIG. 1, the grounding edge T is illustrated as being continuous in the tire circumferential direction.

The ground contact region is a region where the tread surface 2A of the tread portion 2 of the pneumatic tire 1 comes into contact with a dry road surface, when the pneumatic tire 1 is mounted on a regular rim, is inflated to a regular internal pressure, and is loaded with 70% of the regular load.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO).

"Regular internal pressure" refers to a "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO.

"Regular load" refers to a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

In the pneumatic tire 1 of the present embodiment, both sides of the tire lateral direction are formed symmetrically with respect to the tire equatorial plane CL.

In addition, although the pneumatic tire 1 of the present embodiment has been described as including four main grooves 3 and five land portions 4, any configuration may be employed as long as the middle land portion 4B is provided. For example, five main grooves 3 and seven land portions 4 may be provided. In addition, a main groove 3 may be further provided between the middle land portion 4B and the shoulder land portion 4C, and the land portion 4 may be further sectioned.

In this manner, the pneumatic tire 1 of the present embodiment includes, in the tread surface 2A of the tread portion 2, a pair of main grooves 3 (center main groove 3A and shoulder main groove 3B) that extend in the tire circumferential direction and are arranged side by side in the tire lateral direction; land portions 4 (middle land portion 4B) defined by the main grooves 3; a plurality of lug grooves 7 arranged side by side in the tire circumferential direction such that each lug groove 7 includes one end 7a communicating with the shoulder main groove 3B and the other end terminating within the middle land portion 4B, and each lug groove 7 is bent and folded back at the bending point 7c in the middle of a path from the one end 7a to the other end 7b; and sipes 8 provided to extend across the lug groove 7, wherein at least one of the sides divided by the lug groove is formed in a zigzag shape.

In this pneumatic tire 1, since the lug groove 7 includes the one end 7a communicating with the shoulder main groove 3B, the other end 7b terminating within the middle land portion 4B, and the bending point 7c in the middle of the path from the one end 7a to the other end 7b so as to be bent and folded back, it is possible to secure a groove area inside the middle land portion 4B, retain water drainage performance, and secure steering stability on a wet road surface.

In addition, since the lug groove 7 includes the one end 7a communicating with the shoulder main groove 3B and the other end 7b terminating within the middle land portion 4B, it is possible to retain stiffness of the middle land portion 4B and secure steering stability on a dry road surface.

Furthermore, since the sipes 8 are provided, it is possible to improve water drainage performance and secure steering stability on a wet road surface.

Moreover, since the sipes 8 are formed in a zigzag shape, it is possible to improve steering stability on a snowy road surface with an excellent edge effect.

In the pneumatic tire 1 according to the present embodiment, in a configuration in which a virtual line La is drawn from the center of the one end 7a to the bending point 7c, and a virtual line Lb is drawn from the bending point 7c to the other end 7b in the lug groove 7 as illustrated in FIG. 2, an angle θ between the virtual line La and the shoulder main groove 3B (in the tire circumferential direction) ranges from 20° to 35°.

In addition, an angle φ between the virtual lines La and Lb of the lug groove 7 ranges from 0° to 20°.

In this pneumatic tire 1, since the angle θ of the lug groove 7 is set to 20° or greater, it is possible to suppress a difference of stiffness between both sides of the middle land portion 4B with respect to the lug groove 7 and assist securement of steering stability on a dry road surface.

Meanwhile, since the angle θ of the lug groove 7 is set to 35° or less, it is possible to suppress the lug groove 7 from excessively approaching the shoulder main groove 3B, widen the groove width, and secure the groove area. Therefore, it is possible to secure steering stability on a wet road surface and assist improvement of steering stability on a snowy road surface.

In addition, since the bent angle φ of the lug groove 7 is set to 0° or greater, it is possible to suppress a difference of stiffness between both sides of the middle land portion 4B with respect to the lug groove 7 and assist securement of steering stability on a dry road surface.

Meanwhile, since the bent angle φ of the lug groove 7 is set to 20° or less, it is possible to suppress a difference of stiffness between both sides of the middle land portion 4B with respect to the lug groove 7 and assist securement of steering stability on a dry road surface.

Note that, if the angle φ has a negative value, the center of the other end 7b is positioned over the virtual line La from the position of FIG. 2, and the virtual line Lb is opposite to the position of FIG. 2 with respect to the virtual line La.

In the pneumatic tire 1 according to the present embodiment, it is preferable that the one end 8a side (one side) of the sipe 8 with respect to the lug groove 7 communicates with the main groove 3, the other end 8b side (the other side) does not communicate with the main groove 3 as illustrated in FIG. 2, an acute angle α of the one end 8a side with respect to the tire circumferential direction (main groove 3) ranges from 45° to 70°, and an acute angle β of the other end 8b side with respect to the tire circumferential direction is within a range of α±10°.

Note that the angles α and β of the sipe 8 are acute angles of straight lines Lc and Ld obtained by connecting one end and the other end of the sipe 8 divided by the lug groove 7 with respect to the tire circumferential direction.

In this pneumatic tire 1, since the angle α is set to 45° or greater, it is possible to suppress degradation of stiffness in the middle land portion 4B and assist securement of steering stability on a dry road surface.

Meanwhile, since the angle α is set to 70° or less, it is possible to assist improvement of steering stability on a snowy road surface with an excellent edge effect in the lateral direction (tire lateral direction).

In addition, since the angle β is within a range of α±10°, and the sipe 8 extends substantially straightly across the lug groove 7, it is possible to improve water drainage performance and assist securement of steering stability on a wet road surface.

The angle β is more preferably equal to the angle α.

In the pneumatic tire 1 according to the present embodiment, it is preferable that the one end 8a of the sipe 8 communicates with the main groove 3, and the other end 8b terminates within the middle land portion 4B.

In this pneumatic tire 1, since the one end 8a of the sipe 8 communicates with the main groove 3, it is possible to improve water drainage performance and assist securement of steering stability on a wet road surface.

In addition, since the other end 8b of the sipe 8 terminates within the middle land portion 4B, it is possible to retain stiffness of the middle land portion 4B and assist securement of steering stability on a dry road surface.

In the pneumatic tire 1 according to the present embodiment, it is preferable that the width d1 of the zigzag shape of the sipe 8 is set to 3 mm or less, and the pitch d2 between closest bending points of the zigzag shape in the extending direction is set to 3 mm or less as illustrated in FIG. 3.

The width d1 of the zigzag shape is a shortest dimension between the straight line Le obtained by connecting the bending points P1 and P2 constituting a wavelength of the zigzag shape and the intermediate bending point P3 of the wavelength as illustrated in FIG. 3.

In addition, the pitch d2 of the zigzag shape is a shortest dimension between the bending points P1 and P3 in the extending direction.

In this pneumatic tire 1, since the width d1 of the zigzag shape of the sipe 8 is set to 3 mm or less, it is possible to suppress degradation of stiffness around the sipe 8 and assist securement of steering stability on a dry road surface.

In addition, since the pitch d2 between the bending points of the zigzag shape of the sipe 8 in the extending direction is set to 3 mm or less, it is possible to assist improvement of the steering stability on a snowy road surface with an excellent edge effect.

Note that the width d1 of the zigzag shape of the sipe 8 preferably ranges from 1.5 mm to 3 mm in order to suitably obtain an edge effect.

In addition, the pitch d2 between the bending points of the zigzag shape in the extending direction of the sipe 8 preferably ranges from 1.5 mm to 3 mm in order to suppress degradation of stiffness.

EXAMPLES

Figure 4:
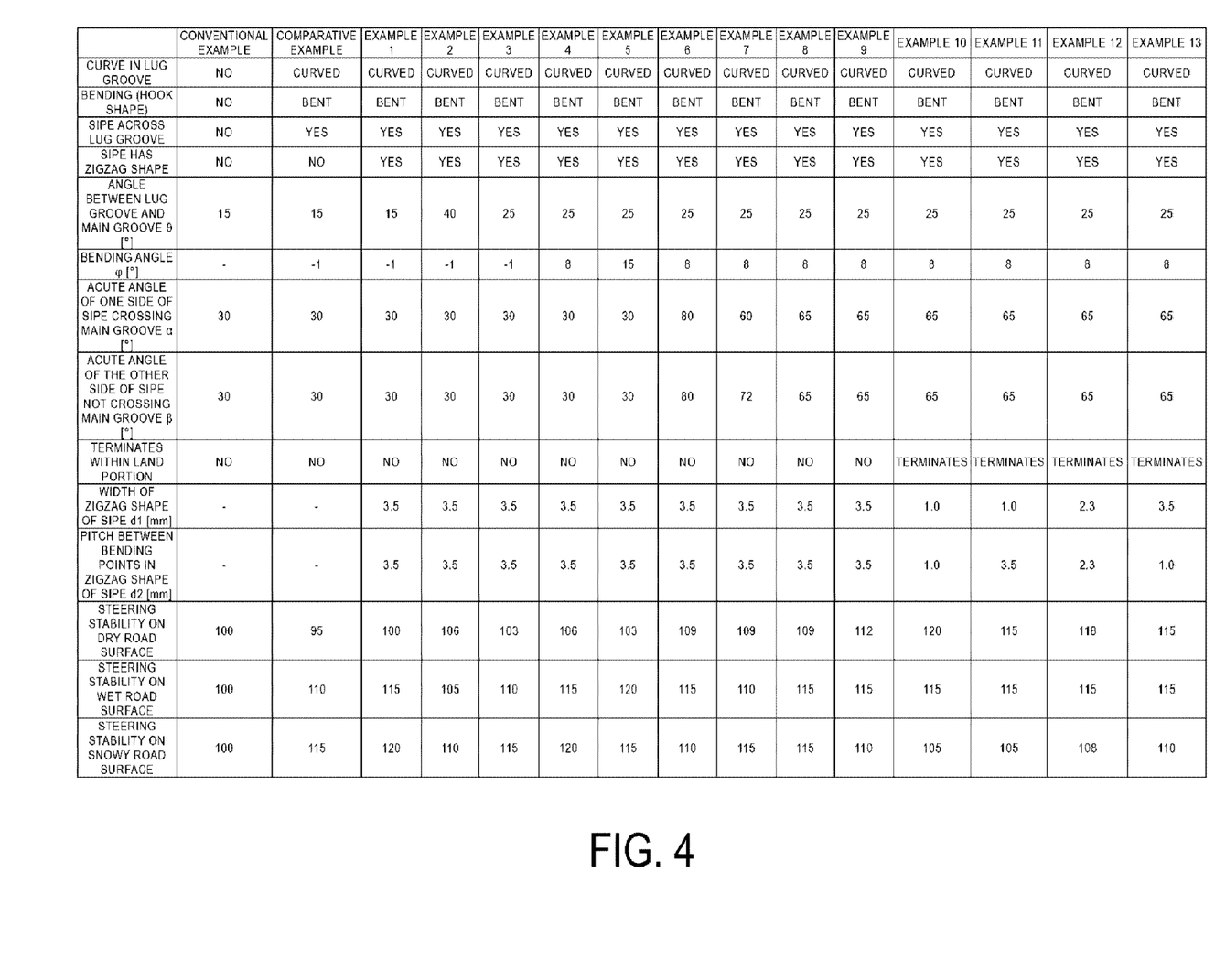
FIGS. 4A-4B include a table showing results of performance tests for pneumatic tires in examples of the present technology.
Figure 4A:
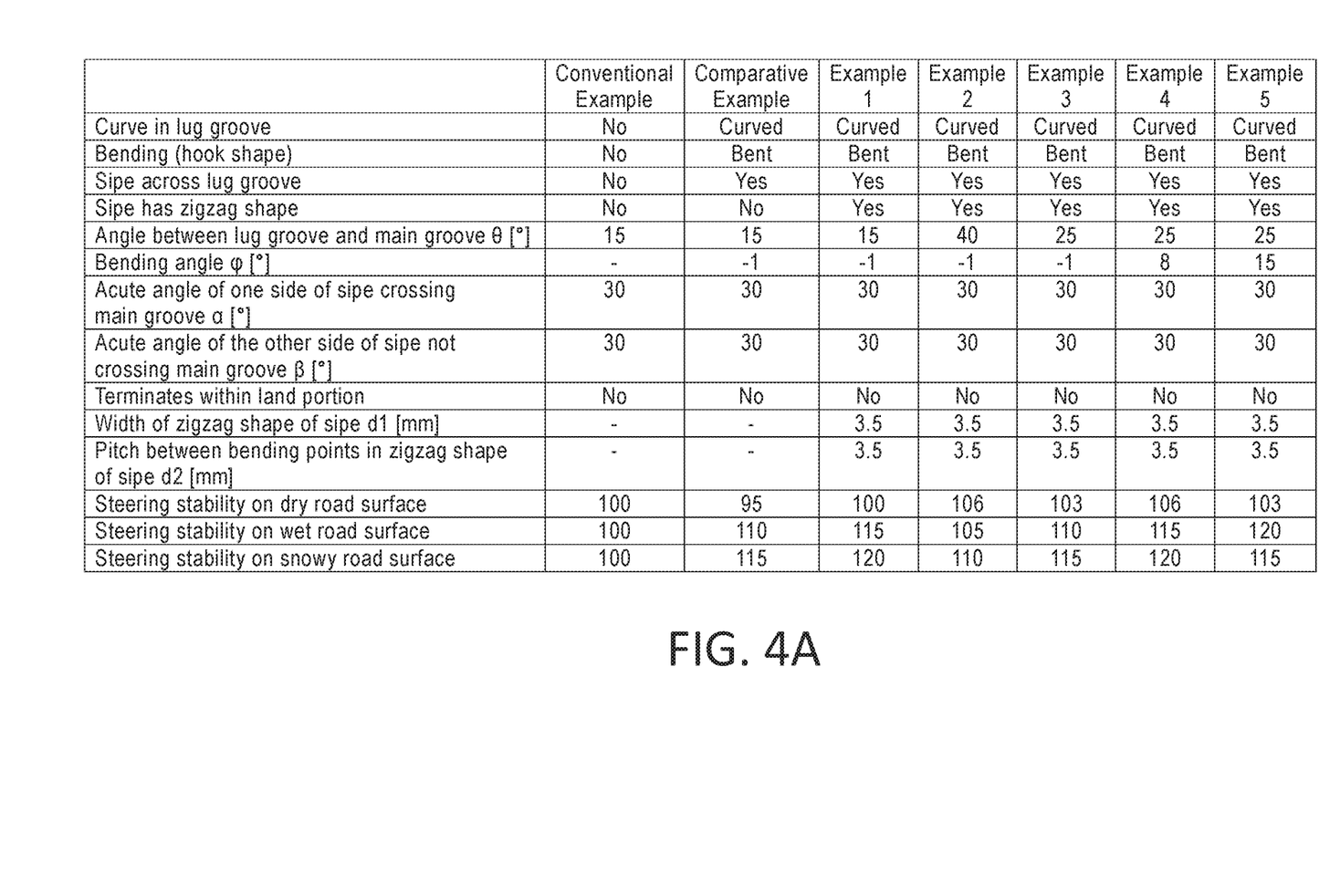
Figure 4B:
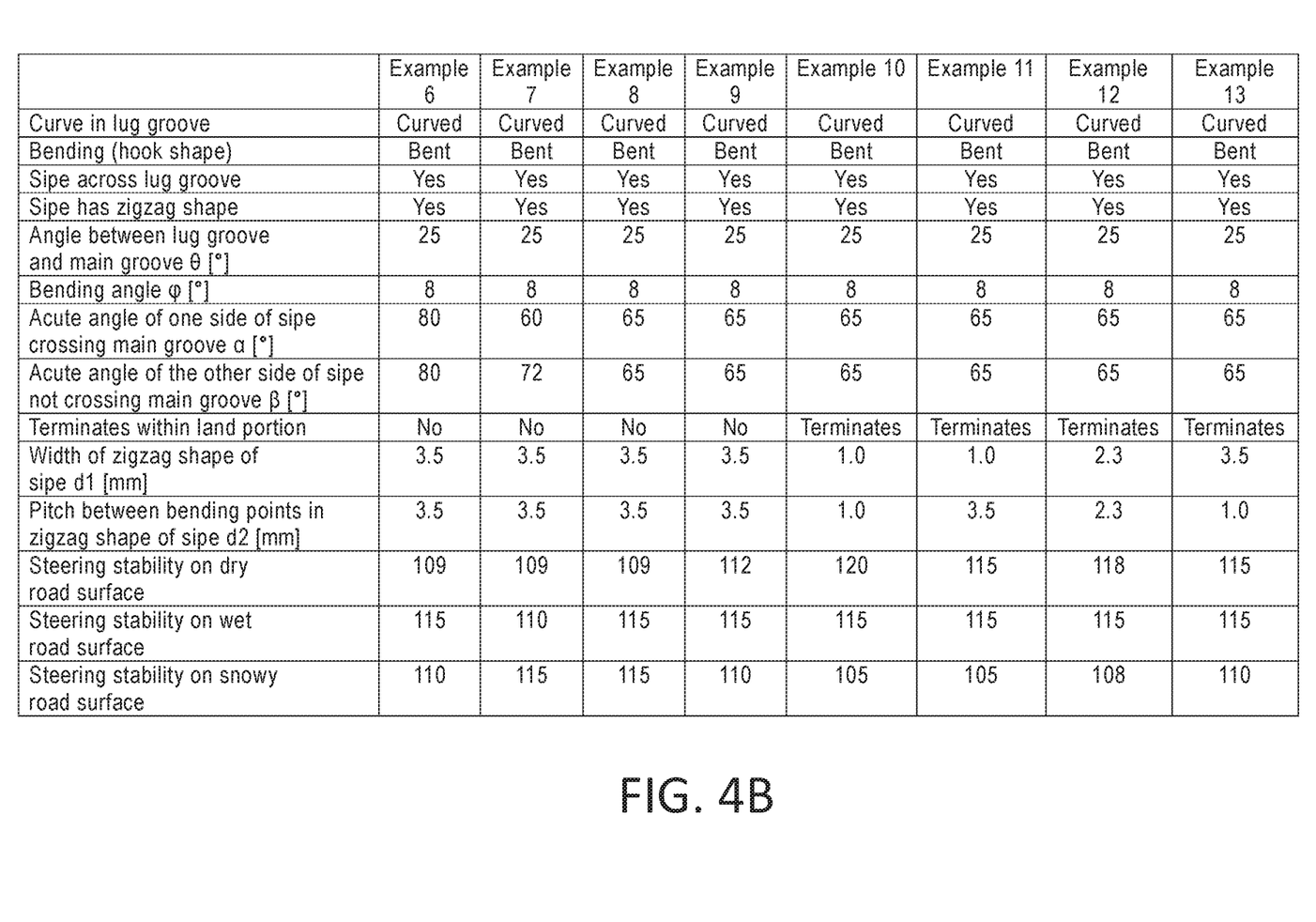

In the examples, performance tests for steering stability on dry, wet and snowy road surfaces were performed for a plurality of types of pneumatic tires under different conditions (see FIGS. 4A-4B).

In these performance tests, pneumatic tires having a tire size of 215/65R17 96H were assembled on 17×6.5 JJ regular rims, were inflated to the regular internal pressure (230 kPa), and were mounted on a test vehicle (domestic recreational vehicle (RV)).

As a method of evaluating the steering stability on a dry road surface, sensory evaluation was performed by an experienced test driver on a test course having a dry road surface using the test vehicle for responsiveness in a lane change operation and a cornering operation (responsiveness immediately after handling).

In this sensory evaluation, indices were given by setting an index of a pneumatic tire of the conventional example to "100". The higher index indicates the better steering stability on a dry road surface.

As a method of evaluating steering stability on a wet road surface, sensory evaluation was performed by an experienced test driver on a wet test course having a depth of 3 mm using the test vehicle for a steering property in a lane change operation and a cornering operation and stability in a straight travel.

In this sensory evaluation, indices were given by setting an index of a pneumatic tire of the conventional example to "100". The higher index indicates the better steering stability on a wet road surface.

As a method of evaluating steering stability on a snowy road surface, a lap time was measured in a turning operation on a curved course having a snowy road surface with a radius of 30 m using the test vehicle.

On the basis of a result of this measurement, indices were given by setting an index of a pneumatic tire of the conventional example to "100". The higher index indicates the better steering stability on a snowy road surface.

The pneumatic tire of FIGS. 4A-4B has four main grooves and five land portions defined by the main grooves.

The pneumatic tire of the conventional example has lug grooves and sipes formed in the center land portion as illustrated in FIG. 1.

In addition, the pneumatic tire of the conventional example has lug grooves formed to have a straight line shape in the middle land portion and inclined in the tire circumferential direction and straight sipes having both ends communicating with the main grooves.

Furthermore, the pneumatic tire of the conventional example has lug grooves and sipes in the shoulder land portion as illustrated in FIG. 1.

The pneumatic tire of the comparative example has lug grooves and sipes in the center land portion as illustrated in FIG. 1.

In addition, the pneumatic tire of the comparative example has lug grooves in the middle land portion as illustrated in FIG. 1. However, both ends of the straight sipes communicate with the main grooves.

Furthermore, the pneumatic tire of the comparative example has lug grooves and sipes in the shoulder land portion as illustrated in FIG. 1.

Meanwhile, the pneumatic tires of Examples 1 to 13 have lug grooves and sipes in the center land portion as illustrated in FIG. 1.

In addition, the pneumatic tires of Examples 1 to 13 have lug grooves and sipes in the middle land portion as illustrated in FIG. 1.

Furthermore, the pneumatic tires of Examples 1 to 13 have lug grooves and sipes in the shoulder land portion as illustrated in FIG. 1.

From the test results of FIG. 4, it is recognized that, using the pneumatic tires of Examples 1 to 13, the steering stability is secured on dry and wet road surfaces and is improved on a snowy road surface.

The invention claimed is:

1. A pneumatic tire comprising:
   in a tread surface of a tread portion,
   a pair of main grooves arranged side by side in a tire lateral direction and extending in a tire circumferential direction;
   a land portion defined by the main grooves;
   a plurality of lug grooves arranged side by side in the tire circumferential direction and bent and folded back, each of the lug grooves including one end communicating with one of the main grooves, an other end terminating within the land portion, and a bending point in a middle of a path from the one end to the other end, the other end of each of the lug grooves being provided between the one end of each of the lug grooves and the bending point in the tire circumferential direction; and
   sipes extending across the lug grooves, one side of each of the sipes with respect to each of the lug grooves being formed in a zigzag shape and an other side of each of the sipes with respect to each of the lug grooves being formed in a linear shape;
   wherein one end of each of the sipes communicates with one of the main grooves, and an other end of each of the sipes does not communicate with an other one of the main grooves.

2. The pneumatic tire according to claim 1, wherein one end of each of the sipes with respect to each of the lug grooves communicates with one of the main grooves, and
   the other end of each of the sipes terminates within the land portion.

3. The pneumatic tire according to claim 2, wherein an acute angle α of one end side of each of the sipes with respect to the tire circumferential direction ranges from 45° to 70°, and an acute angle β of an other end side of each of the sipes with respect to the tire circumferential direction is within an angle range of α±10°.

4. The pneumatic tire according to claim 3, wherein the zigzag shape of the sipes has a width d1 of 3 mm or less and a pitch d2 between closest bending points in an extending direction set to 3 mm or less.

5. The pneumatic tire according to claim 1, wherein an acute angle a of one end side of each of the sipes with respect to the tire circumferential direction ranges from 45° to 70°, and an acute angle β of an other end side of each of the sipes with respect to the tire circumferential direction is within an angle range of α±10°.

6. The pneumatic tire according to claim 1, wherein the zigzag shape of the sipes has a width d1 of 3 mm or less and a pitch d2 between closest bending points in an extending direction set to 3 mm or less.

7. The pneumatic tire according to claim 1, wherein:
the lug grooves have a curved shape from the one end to the bending point,
the sipes each extend across a portion of the curved shape of the lug grooves,
the one side of each of the sipes at an inner side of the curved shape is formed in a zigzag shape, and
the other side of each of the sipes at an outer side of the curved shape is formed in a linear shape.

8. The pneumatic tire according to claim 1, wherein:
the one side of the sipes is an outer side of the tire lateral direction with respect to the lug grooves, and
the other side of the sipes is an inner side of the tire lateral direction with respect to the lug grooves.

9. The pneumatic tire according to claim 1, wherein the other ends of each of the lug grooves terminates in the land portion without communicating with one of the main grooves and without communicating with one of the lug grooves.

10. A pneumatic tire comprising:
in a tread surface of a tread portion,
a pair of main grooves arranged side by side in a tire lateral direction and extending in a tire circumferential direction;
a land portion defined by the main grooves;
a plurality of lug grooves arranged side by side in the tire circumferential direction and bent and folded back, each of the lug grooves including one end communicating with one of the main grooves, an other end terminating within the land portion, and a bending point in a middle of a path from the one end to the other end; and
sipes extending across the lug grooves, one side of each of the sipes with respect to each of the lug grooves being formed in a zigzag shape and an other side of each of the sipes with respect to each of the lug grooves being formed in a linear shape;
wherein the sipes include first sipes and second sipes,
the one side of each of the first sipes formed in the zigzag shape communicates with an outer main groove of the pair of main grooves on an outer side in a tire width direction,
the other side of each of the first sipes formed in the linear shape communicates with one of the lug grooves,
the one side of each of the second sipes formed in the zigzag shape terminates in the land portion without communicating with one of the main grooves and without communicating with one of the lug grooves, and
the other side of each of the second sipes formed in the linear shape communicates with an inner main groove of the pair of main grooves on an inner side in the tire width direction.

11. The pneumatic tire according to claim 10, wherein:
the first sipes and the second sipes are alternately provided in the tire circumferential direction.

12. A pneumatic tire comprising:
in a tread surface of a tread portion,
a pair of main grooves arranged side by side in a tire lateral direction and extending in a tire circumferential direction;
a land portion defined by the main grooves;
a plurality of lug grooves arranged side by side in the tire circumferential direction and bent and folded back, each of the lug grooves including one end communicating with one of the main grooves, an other end terminating within the land portion, and a bending point in a middle of a path from the one end to the other end, the other end of each of the lug grooves being provided between the one end of each of the lug grooves and the bending point in the tire circumferential direction; and
sipes extending across the lug grooves, one side of each of the sipes with respect to each of the lug grooves being formed in a zigzag shape and an other side of each of the sipes with respect to each of the lug grooves being formed in a linear shape;
wherein each of the sipes extends across one of the lug grooves and each of the sipes does not extend across two of the lug grooves.

13. The pneumatic tire according to claim 12, wherein the other ends of each of the lug grooves terminates in the land portion without communicating with one of the main grooves and without communicating with one of the lug grooves.

* * * * *